United States Patent
Benaim et al.

(10) Patent No.: US 10,974,394 B2
(45) Date of Patent: Apr. 13, 2021

(54) ROBOT ASSISTED OBJECT LEARNING VISION SYSTEM

(71) Applicant: Deep Learning Robotics Ltd., Ashdod (IL)

(72) Inventors: Carlos Benaim, Binyamina (IL); Tsofnat Barsheshet, Ashkelon (IL)

(73) Assignee: Deep Learning Robotics Ltd., Caesarea (IL)

( * ) Notice: Subject to any disclaimer, the term of this patent is extended or adjusted under 35 U.S.C. 154(b) by 247 days.

(21) Appl. No.: 16/302,680

(22) PCT Filed: May 18, 2017

(86) PCT No.: PCT/IL2017/050564
§ 371 (c)(1),
(2) Date: Nov. 19, 2018

(87) PCT Pub. No.: WO2017/199261
PCT Pub. Date: Nov. 23, 2017

(65) Prior Publication Data
US 2019/0126487 A1    May 2, 2019

Related U.S. Application Data

(60) Provisional application No. 62/338,558, filed on May 19, 2016.

(51) Int. Cl.
*B25J 9/16*    (2006.01)
*G06T 1/00*    (2006.01)

(52) U.S. Cl.
CPC ............. *B25J 9/1697* (2013.01); *B25J 9/163* (2013.01); *G06T 1/0014* (2013.01); *G05B 2219/40565* (2013.01)

(58) Field of Classification Search
CPC ...... B25J 11/0045; B25J 9/1697; B25J 9/163; B25J 9/023; G06T 1/0014; G05B 2219/40565; G05B 2219/40575
See application file for complete search history.

(56) References Cited

U.S. PATENT DOCUMENTS

| 8,923,602 B2 | 12/2014 | Melikian et al. |
| 2009/0033655 A1 | 2/2009 | Boca et al. |

(Continued)

FOREIGN PATENT DOCUMENTS

| WO | WO 2017/199261 | 11/2017 |

OTHER PUBLICATIONS

International Preliminary Report on Patentability dated Nov. 29, 2018 From the International Bureau of WIPO Re. Application No. PCT/IL2017/050564. (6 Pages).

(Continued)

*Primary Examiner* — Jeff A Burke
*Assistant Examiner* — Jamal A Shah

(57) ABSTRACT

According to an aspect of some embodiments of the present invention there is provided a method for generating a dataset mapping visual features of each of a plurality of objects, comprising: for each of a plurality of different objects: instructing a robotic system to move an arm holding a respective the object to a plurality of positions, and when the arm is in each of the plurality of positions: acquiring at least one image depicting the respective object in the position, receiving positional information of the arm in respective the position, analyzing the at least one image to identify at least one visual feature of the object in the respective position, and storing, in a mapping dataset, an association between the at least one visual feature and the positional information, and outputting the mapping dataset.

34 Claims, 8 Drawing Sheets

(56) References Cited

U.S. PATENT DOCUMENTS

| | | |
|---|---|---|
| 2010/0021051 A1 | 1/2010 | Melikian et al. |
| 2012/0053728 A1 | 3/2012 | Theodorus et al. |
| 2013/0345873 A1 | 12/2013 | Blumberg et al. |
| 2014/0085420 A1* | 3/2014 | Shahinian ............ A61B 1/0646 348/45 |
| 2014/0118500 A1* | 5/2014 | Liu ...................... H04N 13/204 348/46 |
| 2016/0167228 A1* | 6/2016 | Wellman ................ B25J 9/1697 700/218 |

OTHER PUBLICATIONS

International Search Report and the Written Opinion dated Aug. 24, 2017 From the International Searching Authority Re. Application No. PCT/IL2017/050564. (10 Pages).

Supplementary European Search Report and the European Search Opinion dated Dec. 20, 2019 From the European Patent Office Re. Application No. 17798895.3. (9 Pages).

Communication Pursuant to Article 94(3) EPC dated Oct. 21, 2020 From the European Patent Office Re. Application No. 17798895.3. (9 Pages).

* cited by examiner

ROBOT ASSISTED OBJECT LEARNING VISION SYSTEM

RELATED APPLICATIONS

This application is a National Phase of PCT Patent Application No. PCT/IL2017/050564 having International filing date of May 18, 2017, which claims the benefit of priority under 35 USC § 119(e) of U.S. Provisional Patent Application No. 62/338,558 filed on May 19, 2016. The contents of the above applications are all incorporated by reference as if fully set forth herein in their entirety.

FIELD AND BACKGROUND OF THE INVENTION

The present invention, in some embodiments thereof, relates to methods and systems for generating and using dataset mapping visual features of objects and, more particularly, but not exclusively, for robot assisted object learning by visual systems.

It is well known in the art that robotic machines are widely deployed in a variety of industrial applications. Many of those applications utilize robotic machines working together as a robotic team. Deploying robotic machines requires the assignment of tasks to be performed by the robotic machines. There are different known methods to define the task for the robotic machine. Typically, the methods require a collaboration effort of at least a computer programming engineer and a process engineer. Such team needs to setup the task using basic machine movement instructions, and then fine tune these motions in a step by step process until the new robotic machine task is refined enough for real life operation.

A robotic machine has to have capability of identifying objects in order to perform relevant tasks related to an object. Vision systems with different types of sensors combined with processing units executing image analysis software are widely used to identify objects in an operational scene. The sensors and the dedicated software are designed and set to determine the physical location of the object relative to the sensors and/or to other objects or equipment in the scene.

Examples of such applications are vision systems used to assist robots in performing tasks with objects that are at reach and whose positions are not fixed or not previously known.

An example of one of the methods known in the industry, of teaching a robotic machine a task to be performed, is based on learning by demonstration. Such method includes steps of collecting a sequence of images showing a demonstrator performing a manipulation of an object. An analysis is performed on the images and identification of the demonstrator body parts while manipulating the object is conducted. Based on the analysis, robotic machine movements are defined to perform the demonstrated task and relevant motion command for instructing the robotic machine to perform the task is generated.

Currently, commonly used image analysis tools require specialized and a significant effort-consuming processing as customization for each particular object is required when a search in the scene is performed. Additional significant computational effort is required to calibrate the sensors and robots in order to translate the position of the given objects to coordinates that are relative to the robot's positions. Another challenge is the difficulty in current systems in translating two dimensional (2D) positions of objects that are detected in images captured by cameras into three dimensional (3D) positions that can be later translated into relative positions with respect to the robot. The use of depth maps sensors helps to reduce the last difficulty, however other serious limitations caused by outdoor light effects and image resolution are still a challenge to such systems.

The challenges and problems accompanying the task of identifying and locating objects in space affect many other applications, like in mobile applications for Smartphones, as well as for PC, tablets and other devices.

SUMMARY OF THE INVENTION

According to an aspect of some embodiments of the present invention there is provided a method for generating a dataset mapping visual features of each of a plurality of objects, comprising: for each of a plurality of different objects: instructing a robotic system to move an arm holding a respective the object to a plurality of positions, and when the arm is in each of the plurality of positions: acquiring at least one image depicting the respective object in the position, receiving positional information of the arm in respective position, analyzing the at least one image to identify at least one visual feature of the object in the respective position, and storing, in a mapping dataset, an association between the at least one visual feature and the positional information, and outputting the mapping dataset.

Optionally, the at least one image is captured by at least one camera.

Optionally, the at least one image is a depth map captured by at least one sensor.

Optionally, the at least one visual feature is a member of a group consisting of a two dimensional image feature (2D) and a three dimensional (3D) image feature.

Optionally, the instructing includes at least one motion command that includes a step size and a step direction.

More optionally, the step size and the step direction are pre-defined.

More optionally, the step size and the step direction are randomly selected.

Optionally, the at least one visual feature is a member of a group consisting of contour, center of contour, number of contours, edges, color areas, size, perimeter and area.

Optionally, the at least one visual feature is a plurality of features including at least the features of: a sum of a blue channel value of all pixels within a contour of the object, divided by a sum of a green channel value and a red channel value of all pixels in the contour of the object, a sum of the green channel value of all pixels within the contour of the object, divided by a sum of the blue channel value and the red channel value of all pixels in the contour of the object, a sum of the red channel value of all pixels within the contour of the object, divided by a sum of the blue channel value and the green channel value of all pixels in the contour of the object, a perimeter of the object and a number of corners of the object.

More optionally, the blue channel value is a modified blue channel value calculated according to a weighted calculation of the blue channel value, the green channel value and the red channel value, the green channel value is a modified green channel value calculated according to a weighted calculation of the blue channel value, the green channel value and the red channel value, and the red channel value is a modified red channel value calculated according to a weighted calculation of the blue channel value, the green channel value and the red channel value.

Even more optionally, the plurality of features further including the features of: an indication when a sum of a modified blue channel value of all pixels within the contour of the object, divided by a sum of modified green channel value and modified red channel value of all pixels in the contour of the object is greater, or smaller than a first predefined threshold divided by a total number of pixels in the contour of the object, an indication when a sum of a modified red channel value of all pixels within the contour of the object, divided by a sum of modified green channel value and modified blue channel value of all pixels in the contour of the object is greater, or smaller than a second predefined threshold divided by the total number of pixels in the contour of the object, and an indication when a sum of a modified green channel value of all pixels within the contour of the object, divided by a sum of modified red channel value and modified blue channel value of all pixels in the contour of the object is greater, or smaller than a third predefined threshold divided by the total number of pixels in the contour of the object.

More optionally, when the object has a spherical or elliptical shape, the plurality of features further including a factor calculated by a division of a dimension of major axis of the spherical or elliptical shape by a dimension of a minor axis of the spherical or elliptical shape.

Optionally, the storing includes storing in the mapping dataset a quantified value of the at least one visual feature.

Optionally, the analyzing includes identifying in the at least one image at least one identifiable sign attached to at least one of the object and a gripping part of the robotic system.

Optionally, the robotic system is a conveyer having a conveyer belt for moving the object.

Optionally, the positional information is extracted by an encoder.

Optionally, the storing includes storing of at least one characteristic of the object, provided by a user.

More optionally, the at least one characteristic is an indication of the object being characterized as a good object or a bad object.

According to an aspect of some embodiments of the present invention there is provided a method for generating a dataset mapping visual features of each of a plurality of objects, comprising: for each of a plurality of different objects: instructing a mechanical device equipped with at least one sensor to move to a plurality of positions, and when the mechanical device is in each of the plurality of positions: acquiring at least one image, captured by the at least one sensor, and depicting the respective object from a perspective of the position, receiving positional information of the mechanical device in respective the position, analyzing the at least one image to identify at least one visual feature of the object from the perspective of the respective position, and storing, in a mapping dataset, an association between the at least one visual feature and the positional information, and outputting the mapping dataset.

Optionally, the instructing includes at least one motion command that includes a step size and a step direction.

More optionally, the step size and the step direction are pre-defined for the training session.

More optionally, the step size and the step direction are randomly selected.

Optionally, the at least one sensor is a camera.

Optionally, the at least one image is a depth map.

Optionally, the at least one visual feature is a member of a group consisting of a two dimensional image feature (2D) and a three dimensional (3D) image feature.

Optionally, the mechanical device is a robotic machine.

Optionally, the at least one visual feature is a member of a group consisting of contour, center of contour, number of contours, edges, color areas, size, perimeter and area.

Optionally, the storing includes storing in the mapping dataset a quantified value of the at least one visual feature.

Optionally, the analyzing includes identifying in the at least one image at least one identifiable sign attached to the object.

According to an aspect of some embodiments of the present invention there is provided a method for using a dataset mapping visual features of each of a plurality of objects, comprising: using at least one processor to execute code instructions for: obtaining at least one image depicting an object, analyzing the at least one image to extract at least one image visual feature of the object, searching, in a plurality of previously stored mapping data sets, to identify a data record included in one of the plurality of previously stored mapping datasets and associated with the at least one image visual feature, wherein each of the plurality of previously stored mapping datasets is associated with another one of a plurality of objects, extracting from the identified data record, an object identification attribute and object positional information associated with the at least one visual feature, outputting the object positional information and the object identification attribute.

Optionally, the execution of code instructions is repeated when the object is positioned in another one of a plurality of pre-determined positions.

Optionally, the at least one image is captured by a camera.

More optionally, the object positional information includes positional information of at least one identifiable sign.

Even more optionally, the method further comprising using the at least one processor to execute code instructions for adjusting said object positional information according to said positional information of said at least one identifiable sign.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data.

Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
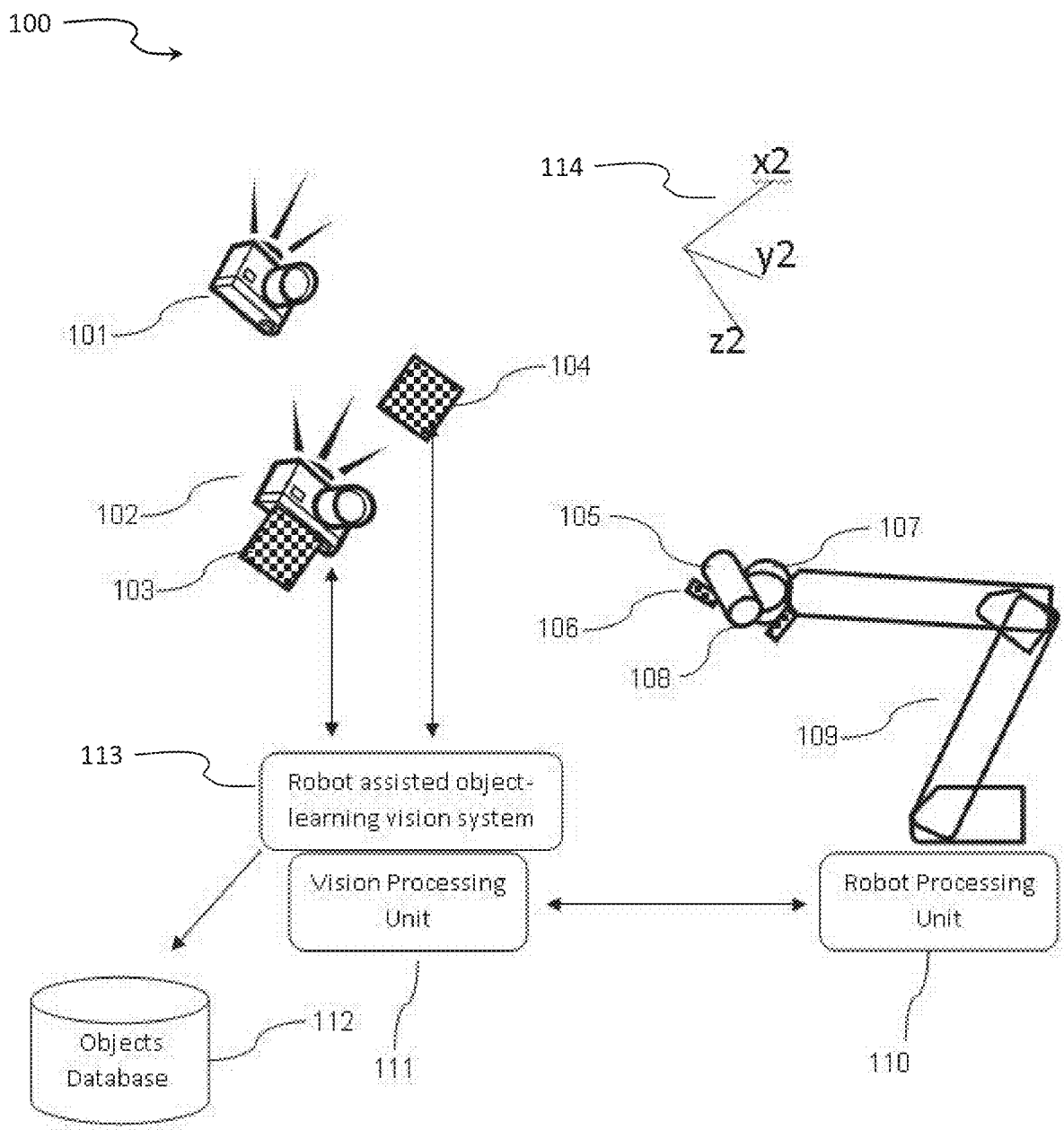
FIG. 1 is a schematic illustration of an exemplary scenario of generating a dataset mapping visual features of an object, according to some embodiments of the present invention.

The present invention, in some embodiments thereof, relates to methods and systems for generating and using dataset mapping visual features of objects and, more particularly, but not exclusively, for robot assisted object learning by visual systems.

According to an aspect of some embodiments of the present invention there is provided a method for generating a dataset mapping visual features of each of a plurality of objects, comprising: for each of a plurality of different objects: instructing a robotic system to move an arm holding a respective the object to a plurality of positions, and when the arm is in each of the plurality of positions: acquiring at least one image depicting the respective object in the position, receiving positional information of the arm in respective the position, analyzing the at least one image to identify at least one visual feature of the object in the respective position, and storing, in a mapping dataset, an association between the at least one visual feature and the positional information, and outputting the mapping dataset.

As used herein, the term 2D means a two dimensional positional attribute in space.

As used herein, the term 3D means a three dimensional positional attribute in space.

Common techniques and methods for adapting robotic machines to perform specific tasks manipulating objects involve the use of image sensors and computer processors equipped with dedicated software, including image analysis tools. Such tools require specialized and effort-consuming processing as customization for each particular object is required when a search in the scene is performed. Additional significant computational effort is required to calibrate the sensors and robots in order to translate the position of the given objects to coordinates that are relative to the robot's positions. Another technical problem is the difficulty in current systems in translating 2D positions of objects that are detected in images captured by cameras into 3D positions that may be later translated into relative positions with respect to the robot. The use of depth maps sensors helps to reduce the last difficulty, however other serious limitations caused by outdoor light effects and image resolution are still a challenge to such systems.

As used herein, the term "mechanical device" and the term "robot" or "robotic machine" mean a device that has at least one degree of freedom in motion, and has the capability of generating positional data.

As used herein, the term "object being trained to the system" means an object that the system went through learning process to be able to identify the object and identify its location.

As used herein, the terms "training set" and "dataset" mean a set of records generated for an object being trained to the system. The two terms are used interchangeably along this document.

The present invention, in some embodiments thereof, identifies and locates objects without the need for involvement of technically qualified individuals and that may be adapted to any type of object that is trained and learned by the system.

In accordance with some embodiments of the present invention, there is provided a method for training vision systems to identify and locate objects in their field of view. The method consists of three main stages (1) a training stage in which a training set which maps visual features of different objects is generated, (2) a processing stage in which the training set is processed and identification and location data is generated, and (3) an identifying and locating stage for using the generated dataset to identify and locate objects.

The generation of the dataset is based on capturing images of a known object by sensors of a vision system, from different positions. Then, combining 2D and 3D visual features detected by the vision system together with positional data reported by a mechanical device, such as a robot, that either has a fixed position relative to the object, a fixed position relative to the sensor or fixed position relative to both. The features and the associated position are recorded in a dataset for the specific object.

The use of the dataset is based on capturing images of an unknown object by sensors of a vision system, from different positions. Then, extracting visual features of the object and comparing them to visual features of the datasets. When a match is found, the object identification and positional information is extracted from the dataset. This extracted information is then available for adapting the respective mechanical device or robotic machine to the identified object in the identified location.

During the training session a system that consists of at least one sensor collects a plurality of images in a given scene where the target object or objects are present. The sensor may be a digital camera, an analog camera, a depth map sensor and the like.

Target objects are, for example, biscuits, vegetables, boxes, wet wipes, manufactured goods, raw materials, semi-manufactured goods, packing boxes, cases, etc.

In one exemplary scenario, the sensor is physically attached to a mechanical device such as a robotic machine, and is connected to a vision processing unit. The mechanical device is also connected to a controller processing unit. These vision processing unit and the controller processing unit may share hardware and/or software.

During the training stage, for each object that is being trained to the system, a dataset mapping visual features is generated. For each object an iterative process is conducted. Each iteration includes the steps described herein. The mechanical device's processing unit runs a software module that instructs the robot to move one step in a given or random direction and in a given or random step size. After this, the vision processing unit runs a software module that collects one or more images from the sensor or sensors. The images depict the object. These images are analyzed and main visual features are extracted. Depth maps of the object may also be collected and analyzed.

Optionally, the mechanical device is a conveyer.

Optionally, the positional data is extracted by an encoder. The encoder may be an optical encoder, analog encoder, digital encoder or the like.

For example, the image analysis module of the vision processing unit may run the "openCV" function (Open Source Computer Vision which is a library of programming functions mainly aimed at real-time computer vision), e.g. "fitEllipse", "findContour" and "extractContours". These programming functions are mainly designed to segment and to recognize all the shapes present in an image. For example, "fitEllipse" compares each contour found in the image with approximations to ellipse-shaped contours, and then determines if shape is close enough to an ellipse. For example, "findContour" defines a set of points that enclose one object in the image. For example, an image depicting a pyramid, a cube and a potato, the findContour identifies three contours, one for each of the objects in the image. The points of each contour delimit the object in the image. For example, "extractContours" compares each contour with different shapes, and the determined shape is the one with area closest to the contour's area. As an another example, extract 2D features of contours detected in the scene identifies features such as number of contours, contours' sizes, perimeters and areas and the like, calculated in pixel units. The image analysis module may also extract 3D features of these contours by adding derived data from depth maps and/or stereo vision systems. This adds features in real world 3D units as opposed to pixel units. The vision processing unit generates records for a dataset for the object, including the detected visual features and their respective quantified values.

As an example, the following is a list of visual features that may be extracted from an image of an object:

The sum of the blue channel value of all pixels within the contour of the object, divided by sum of green channel value and red channel value of all pixels in the contour of the object.

The sum of the green channel value of all pixels within the contour of the object, divided by sum of blue channel value and red channel value of all pixels in the contour of the object.

The sum of the red channel value of all pixels within the contour of the object, divided by sum of green channel value and blue channel value of all pixels in the contour of the object.

The sum of a modified blue channel value of all pixels within the contour of the object, divided by sum of modified green channel value and modified red channel value of all pixels in the contour of the object.

The sum of a modified green channel value of all pixels within the contour of the object, divided by sum of modified blue channel value and modified red channel value of all pixels in the contour of the object.

The sum of a modified red channel value of all pixels within the contour of the object, divided by sum of modified green channel value and modified blue channel value of all pixels in the contour of the object.

An indication when the sum of a modified blue channel value of all pixels within the contour of the object, divided by sum of modified green channel value and modified red channel value of all pixels in the contour of the object is greater, or smaller than a predefined threshold divided by the total number of pixels in the contour of the object.

An indication when the sum of a modified red channel value of all pixels within the contour of the object, divided by sum of modified green channel value and modified blue channel value of all pixels in the contour of the object is greater or smaller than a predefined threshold divided by the total number of pixels in the contour of the object.

An indication when the sum of a modified green channel value of all pixels within the contour of the object, divided by sum of modified red channel value and modified blue channel value of all pixels in the contour of the object is greater or smaller than a predefined threshold divided by the total number of pixels in the contour of the object.

The perimeter of the object calculated as linear distances between points of contour for object. Optionally, the perimeter is calculated by the function cv:findcontours. Optionally, measurements are expressed in mm when cameras are stereo and/or have depth. Optionally, measurements are expressed in pixels.

In case of spherical or ellipse objects, the factor calculated as major axis divided by minor axis of the ellipse or sphere.

The number of corners of the object. Optionally, the number of corners is reported by function approxContour.

Modified red, green and blue channel (RGB) values may be a weighted calculation of the red, green and blue channel values calculated for each pixel.

For example, a "Y" feature may be calculated for each pixel:

Y=0.3*R+0.6*G+0.1*B//Estimation of Y based on (BGR)—Red channel value for given pixel (R), green channel value of the given pixel (G) and Blue channel value of the given pixel (B).

Modified red channel=R−Y//Estimation of red channel Y based factor.

Modified blue channel=B−Y//Estimation of green channel Y based factor.

Modified green channel=G−Y//Estimation of blue channel Y based factor.

For example, assuming the above three features indicating when a sum of modified color channel values divided by the sum of the modified other colors values is greater or smaller than a threshold, are labeled as feature "a", feature "b" and feature "c". Features "a", "b" and "c" may be generated for a range of predefined thresholds. For example, for threshold=1, features=a1, b1 and c1; for threshold=2 features=a2, b2 and c2.

The position in space of the mechanical device is recorded as positional information by the controller processing unit. The positional information characterizes the 3D position of the mechanical device. For example, in the case of a robot, the controller processing unit may generate a record with six variables: X, Y, Z corresponding to the 3D absolute position of the robot's end point; and Rx, Ry, Rz corresponding to the rotation of the robot's end point with regards to its axes X, Y, Z. These six values are generated as a record and stored by the controller processing unit. The record generated by the vision processing unit and the record generated by the controller processing are associated in the dataset by sharing a common value such as time stamp, or frame sequence. This association enables relating the records in following stages.

Records may be stored in databases, flat files or other digital formats that are either accessible by both vision processing unit and controller processing unit or by each of the processing units independently.

At this stage, the iteration is completed and a next iteration starts. The controller processing unit generates a command to the mechanical device to move one step of predefined or random size and towards a predefined or randomly selected space direction. The vision processing unit retrieves images and depth maps from sensors, and then extracts 2D and 3D features. These images are now captured from a different position as the mechanical device is placed in a different position. The coordinates extracted from the mechanical device and the visual features detected from the images and/or depth maps are stored with an associating common value.

The iterative process may be repeated until reaching a predefined number of iterations, a random number of iterations or calculated threshold. The threshold may be previously configured as number of iterations or as an area in space that must be scanned before finishing the process. "Montecarlo" techniques may be used to shorten the number of positions the mechanical device is moved to, before exiting the iterative process. The records generated during the iterations of the above process are denominated herein as a training set or dataset. Usually there may be one training set for each given object that the system is trained to identify and locate.

The scene that is used for the training session may be set in a way that there is a common background color which differs from the color of the object being trained. The background color may be subtracted by image processing techniques from each image captured during the process. For example, a non-white object is placed in front of a white background or surface. This may assist and may improve the analysis process of identifying visual features extracted in each iteration.

Optionally, identifiable signs are attached to the surface of the object. Such signs may be a square colored sticker, a circle colored sticker, a bar code, a chess-board painted on the surface, a chess-board sticker and the like. The attachment of identifiable signs improves and assists the identification of visual features.

Optionally, identifiable signs are attached to scene objects placed in the training scene. Such scene objects are, for example a conveyer on which the trained object may be placed. For example, three round stickers are attached to the surface of a conveyer. The round stickers form a sort of right triangle. By placing the stickers in such a way that one side of the triangle is bigger than the other side of the triangle formed by the stickers, a 3D pose of the object can be detected in the training stage and then deduced it in the identifying and locating stage.

In another aspect of an embodiment of the present invention the process described above is performed in a scene setup where the object being trained to the system is attached to the mechanical device being displaced, as opposed to being placed in a fixed position in the scene, as described above. The sensor or sensors are located in such way that part or all of mechanical device's reach is within field of view of the sensor or sensors.

In another aspect of an embodiment of the present invention the process described above is performed in a scene setup where the object being trained to the system is placed on a static surface, as opposed to being placed on a moving conveyer, or held by a robot. The sensor or sensors are located in such way that the surface with the object is within field of view of the sensor or sensors.

In the processing stage, a software module scans the records of previous training sets and identifies the image visual features that are unique to the object associated to the current training set. This module may retrieve training sets from previous objects to calculate probability that any given feature uniquely identifies the object corresponding to the training set in question. For example, if previous objects have associated contour features that range in pixel sizes between a minimum iMin and a maximum iMax, and the current object has contours that exceeds iMax+iDelta, then the software determines that this feature alone is enough to uniquely identify the object corresponding to the current training set. On the other hand, when the current training set is inside the iMin–iMax range of previous training sets, and in those previous training sets it is defined that the contour size is enough to uniquely identify those previously trained objects, the software module activates other image features, such as contour area or contour perimeter, of those previous training sets so that they may assist in uniquely identifying them now that a new object, with similar feature, is been trained into the system.

The processing stage may also generate a hierarchical decision tree that allows to uniquely identifying a given object. For example, a regression tree may be used to feed the values associated in each training set to each object. The resulting tree is then used as a decision tree to classify previously trained objects in new scenes. A decision tree may be a dynamic decision tree which, for example has multiple decision nodes. As an example, a first node may be a decision based on the inquiry: "is the contour size bigger than nnnn". When the answer is yes, the decision flow may move for example to a second node where the inquiry is: "is the dominant color blue?" when, for example the answer is yes, the next node may be "what is the area of the object's contour?" The result of the decision tree may be an instruction such as "Look into database for such size of contours with dominant blue color and retrieve 3D properties".

Records from different training sets are indexed by the contour's center feature. Records with same contour's center position (expressed as xy 2D pixel coordinates) from training sets corresponding to different objects may be present. During the processing stage, the software module scans all previous training sets and extracts records sharing same 2D xy pixel coordinate values for the feature "contour center". At this point there is a set of records for each unique xy pixel values, each set being composed of records from previous training sets that share same xy center pixel values for their feature "contour center". The additional visual features associated with each record for an xy center position (i.e. contour size in pixels, contour area in pixels, contour perimeter in pixels, etc.) may be used to feed a regression tree that analyzes features of previous training sets sharing xy center positions. The regression tree generates a classification tree that assigns probabilities for each node that the center of a contour detected in a new future scene in this 2D xy pixel position belongs to a previously trained object. Similar classification tree may be generated using the approach above for each registered xy pixel position found in records for the feature "contour center".

Optionally, other classification models are used for the above stage for achieving same goal as described above. Such other classification models may be neural networks and deep learning models or the like.

The above described dynamically generated regression trees are then stored and used at later stage to assist in the identification of objects detected on new scenes.

The above mentioned "contour center" feature is used as an example. Any other 2D or 3D feature, or combination of them, may be used to uniquely identify the object and its points in space.

Optionally, an end user adds other visual features to the training sets based on known characteristics of the object being trained. For example, when a cube-like object is being trained into the system, and it is known to the user that the cube sides vary in sizes between 3 cm and 3.3 cm, this information may be registered into the system to enable the processing stage to calculate 3D dimensions, and the location of each edge, by combining the 2D detected features with the known measurements registered by the end user.

Optionally, an end user adds feature information to the training set. Such feature information may be a designation of a classification, like "good" object or "bad" object.

Such manually added feature information of "good" and "bad" may be used in a process of classifying new objects that are inspected as "good" or "bad" based on the recorded datasets. This may be served for quality control processes.

Optionally, features may be classification information of the object. For example, an object may be classified as a "cookie" and may further be classified as "cookie 1", or "cookie 2" etc.

For example, in a sorting facility of goods, for example biscuits, or plastic bags with food items (i.e. snacks), for example vegetables or fruits, for example potatoes, or mangos, features like classification of objects as "within specification" or "outside specification" may allow automatic identification of objects within or outside specification in automatic manner, and then this identification is used for automatic sorting. Using potatoes as an example, the system marks anything that does not fall under the classification of "potato". For example, when a stone or strange object is found in the image, the system identifies that the object is not a potato and may send a sign or may stop the production or sorting line. Any object that does not look as a potato, according to the training set of potatoes, may not be considered as a potato and may be classified as "bad". As a following operation, a robot may remove the object. Optionally, the object is marked on a screen of an operator. Optionally, the sorting or production line is stopped. Optionally, the sorting or production line is stopped until the object is removed, etc.

The final stage corresponds to the process of identifying and locating objects in a scene using the data and assisted information generated in the two previous stages.

As an example, the vision processing unit retrieves images from a sensor, in real-time or offline, and extracts image visual features such as contours, fitting shapes (i.e. fitEllipse), and the like. In one scenario the software module retrieves from the stored training sets all the records that present a contour size and a contour center that is close or equal to the center of the contour that is detected in the image being analyzed.

When only a single record is found with these characteristics, the software either assumes that the object in the image corresponds to the object in the training set, or it may retrieve additional features of the object that are found in the image and of the training set to validate that the object in the image is indeed the object of the training set.

When more than one record is found, then additional search in features of multiple records is performed to determine which record has a better match between the image features and the current image of the inspected object.

When a match is found, the positional information previously stored by the mechanical device is retrieved from the record and an estimation is performed as to the relative X, Y, Z position of the object with regards to the sensor. Additionally, an estimated X, Y, Z position relative to the first or last record created during the training set of that object may be retrieved. For example, if in a training stage the object was originally placed exactly in front of the center of the camera, and the match found in the training set corresponds to the image that was taken after either the sensor or object was displaced i, j, k cm in space, then this relative position can also be retrieved from the matching record in the training set for the current image.

The retrieved identification and positional data is then reported or fed to additional software modules that may use the information to control a mechanical device. Such control may direct the mechanical device to move toward the detected object, or to avoid it. Optionally, an end user can be informed with the relative position of the object. Optionally, other applications are fed with the retrieved identification and positional data.

Optionally at least one circular stickers is attached or is painted on the surface of the object being trained. The object is placed at the end point of a robot and in front of a digital camera, depth sensor or combination of them.

The retrieved object positional information may include positional information of identifiable signs such as circular stickers. The position of the stickers in the retrieved positional data may be used to adjust the object positional information according to the positional information of the identifiable sign. For example, three identifiable signs, like markers, are placed over the plane of a conveyer or a table. The 3D position of the markers may be used to "logically" align the plane of the 3D image captured by the camera to a 3D logical image where the markers are aligned to the camera's plane. (i.e. rotate image so that point of one marker, located in position 100, 200, 300 is now set to 0, 0, 0 of camera coordinates, etc.). This adjustment of the positional information greatly assists in detecting the absolute and relative position of the object in training stage and in usage of training data.

Alternatively, the object is placed in a fixed position and the sensor(s) are attached to the end point of the robot. Alternatively, the object is placed on a surface, and the location of the sensor is fixed. The circular stickers may be of a high-contrast color with respect to the background, in order to assist the image segmentation process. As described above, for every given position of the robot, each digital camera and depth sensor sends the image to the vision processing unit. The vision processing unit extracts the pixel coordinates of the center of each sticker, as well as the length, measured in pixels, of the minor and major axes of the 2D ellipse corresponding to the circular stickers. A 2D ellipse is formed when a given circular sticker is not positioned exactly in front of the center of the camera and in a parallel plane, but is instead rotated or translated from that position, so that the shape of the circular sticker looks similar to that of an ellipse in a 2D image. One way to perform this process is, for example, to call the "Opencv" function "fitEllipse" function and/or combine it with the function "findContours". A binary image may be created before running those functions, by segmenting only the color of the circular stickers or signs. As the robot moves during the training stage, each circular sticker or sign gets different values associated to them for x, y center coordinates, major and minor axes in pixels. For each image frame, the robot reports to the vision system the x, y, z coordinates of its end-point and the Rx, Ry, Rz rotation of its end point with regards to each axis. These coordinates are associated with the values extracted from the image of the circular stickers for each frame, and stored in a database for later retrieval.

For example, the following database table record is of stored results of one image frame:

| Circle A | Circle B | Circle C | Robot X | Robot Y | Robot Z | Robot Rx | Robot Ry | Robot Rz |
|---|---|---|---|---|---|---|---|---|
| Center x1y1. Major axis m1, Minor axis n1 | Center x2y2. Major axis m2, Minor axis n2 | Center x3y3. Major axis m3, Minor axis n3 | N1 | N2 | N3 | N4 | N5 | N6 |

In the above example, three round stickers are used—Circle A, Circle B and Circle C. The coordinates of the center of each sticker are x1y1 for Circle A, x2y2 for Circle B and x3y3 for Circle C. The major axis of Circle A is m1 (measured in pixels), and the minor axis of Circle A is n1 (measured in pixels). The major axis of Circle B is m2 (measured in pixels), and the minor axis of Circle B is n2 (measured in pixels). The major axis of Circle C is m3 (measured in pixels), and the minor axis of Circle C is n3 (measured in pixels). "m" and "n" are the axes characterizing the ellipse shape of each sticker as perceived by the sensor or camera. N1, N2 and N3 are the coordinates of the Robot, and N4, N5 and N6 are the rotational position of the end point of the robot compared to the XYZ positional axes.

A table such as the above, includes a plurality of records corresponding to different images, each stores the coordinates, dimensions of major and minor axes of the three stickers with the corresponding N1-N6 parameters of the robot associated with the image taken and recorded.

In the stage of identifying and locating objects in a scene, a new image frame is received from the digital camera and sphere-like or circular-like shapes corresponding to the Circle A, B and C are extracted from the image. This time there is now 3D feedback as in the training stage.

A search is performed through the table, looking for a record that most closely resembles the characteristics of current's frame Circles A, B and C. Once found, the associated robot coordinates (X, Y, Z, Rx, Ry and Rz) offer the 3D features of the object in the frame.

These 3D features correspond to the robot coordinates saved during the training stage when the object was in similar distance and rotation from the camera. They may be used directly, or they may be used to deduce other positions. For example, they may be used to calculate the relative displacement of current object's position with respect to a reference image frame where the object was placed in a plane parallel to the camera and at a known distance from it. They may also be used to calculate rotation and translation matrixes with respect to reference points in the scene or to the coordinate system of the robot. This may be either done at real-time frame collection stage, or in the processing stage. In the processing stage the results of these calculations may also be stored in the database, associated to the particular 2D features of each image frame.

The above scenario is an example for illustration purposes. Other scenarios are optional having different type and number of shapes that may be used, and different mechanical devices may be used.

The training stage may be performed multiple times for the same object. Under this schema, the robot is instructed to move with the object attached to it, around an area just as defined in the training stage. Once the robot is placed in a given position, the identification and location stage is run and an estimated position is obtained based on the original training set. This estimated position is then compared with the actual position of the robot in current training process being run, and the displacement between the current robot position and the one detected from the previous training set is estimated and stored. These values are later on analyzed in order to estimate a) the distribution of the difference between actual and estimated position and b) the likelihood that the estimated 3D position obtained in the location and identification stage from 2D features correspond to the actual 3D position, under a maximum 3D acceptable displacement to be defined by the end-user or automatically calculated and reported by the system, and d) to adjust the 3D positions associated to the 2D features based on the statistical distributions obtained for same 2D features across all training sessions.

Another example of an application using the method is a scene where a robot learns from an orchestra director while the director directs the orchestra. In a training stage, the baton to be used by the orchestra director is fixed to a robotic arm's end point. The training stage is activated and the robot moves the baton in a cubic space while 2D features from the image and 3D features from the robot are retrieved and relationally stored. This can be conducted multiple times as described above. After the processing and analysis stage, the sensors are placed in a way that the baton handled by the orchestra director is within their field of view. The director then directs the orchestra and the 2D features from the image, segmenting the orchestra baton will be translated to 3D features based on the identification and location stage as described herein. The 3D features are then stored and replayed by the robot, that can perform similar movements to the one performed by the orchestra director in order to bring the position of the baton to the same absolute or relative positions in similar time lapses to the ones detected during the orchestra direction. The relative position may be obtained by having one or more reference points in the scene that is captured by the sensors, for example, a marker on the location where some of the performers are sitting.

Some embodiments of the present invention provide the ability to predict 3D aspects of an object based only on data of extracted features from images captured by a camera according to the combination of coordinates of a robot which is holding the object with 2D features extracted from the image. Some embodiments of the present invention provide a method that trains a system to automatically identify different objects in a working environment scenario and to identify the objects location. Common techniques usually require a significant tuning, adjusting and adapting procedures of the robotic machines when switching from one type of object to another, requiring the involvement of operators, engineers and/or programmers, as the system has to be re-calibrated, re-adjusted and adapted to the different object. The methods of some of the embodiments of the present invention reduce the effort to go through such procedures as the system is trained to identify automatically the new objects and automatically identify the object location, when a new object is presented to the system. Based on the process of training the system to identify an object the amount of effort, both computational effort and qualified team effort is reduced. Some of the embodiments of the present invention provide a significant improvement to the performance and precision of the prediction of the 3D pose features of an object, by using the training data as described above. Another improvement to the common manufacturing environment is the ability to combine robot's or conveyer's data with 2D features of objects, during training sessions. The information is then later used as base for improved operation of manufacturing line that may be using conveyers, like assembly and packing as quality assurance functions are applied in automatic manner even when different objects are examined by the system that identifies the object and identifies when the object is within the specification limitations or not. This eliminates the need to adapt the quality assurance functions whenever the object is changed.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, a schematic illustration of an exemplary scenario of generating a dataset mapping visual features of an object, according to some embodiments of the present invention.

As shown in FIG. 1, in the illustrated scenario 100, a mechanical device 109 is shown holding an object 105. The mechanical device may be a robot, a robotic machine, a conveyer or any other mechanical device having at least one degree of freedom in motion in space dimension. Object 105 may be a biscuit, a vegetable, a box, a wet wipe, manufactured goods, raw materials, semi-manufactured goods, a packing box, a case, etc. The robotic machine 109 may be equipped with a gripper 107 for holding the object. Gripper 107 may have various shapes, sizes and designs to be adapted to different objects. A gripper may have different number of degrees of freedom, depending on the design complexity, the operational requirements, the shape and characteristics of the objects and the complexity of the tasks assigned to the robotic machine. The system includes at least one image sensor 101 and 102. The image sensor(s) may be a camera, a depth map sensor and the like. The robotic device is set to move the object 105 from one position in space to another position in space, in front of the image sensor 101, 102. This way, images of the object are captured from different distances, angles and aspects. Visual signs may be attached to the at least one sensor 103, to the object 106, to the end point of the mechanical device 108 and/or to any object or equipment in the field of view of the sensor 104. The visual signs may assist and improve the ability to process images taken by the sensors and to provide improved accuracy in extracting positional information. The visual signs may be bar codes, unique color labels, custom printed stickers in different sizes, chessboard stickers, and the like.

Vision Processing Unit 111 and Object-Learning Vision system 113 are computing systems for processing and analyzing images captured by the image sensors 101 and 102, as is described below. Vision Processing Unit 111 and Object-Learning Vision system 113 may be comprised of software components and hardware elements including, but not limited to, at least one hardware processor, at least one input/output interface, at least one communication interface, memory medium and user interface. Robot Processing Unit 110 is a computing system that receives and processes positional data of the robotic machine and communicates the information with the Object-Learning Vision system 113. The Robot Processing Unit 110 may receive instructions from the Object-Learning Vision system 113 to control the robotic machine 109 to move the object 105 from one position to another position. Robot Processing Unit 110 may be comprised of software components and hardware components, including at least one processor, communication interface, input/output interfaces and memory medium. Objects Database 112 is a storage medium that stores datasets of objects, as will be explained below. The Object Database 112 is controlled by the Object-Learning Vision system. The datasets stored on the Object Database 112 may be in digital format, flat files or other digital data storage format with a schema that is optimized to store and dynamically be retrieved by the Object-Learning Vision system. For illustrative purposes, a virtual three dimensional coordinates system is shown as 114. The positional information reported by the Robot Processing Unit 110 may include 3 dimensional location of the end point of the robotic machine using x, y, z coordinates in the coordinates system 114, and rotational information Rx, Ry, Rz of the end point relative to the x, y, z coordinates. The rotational information may be the rotational information of the wrist movement of the gripper 107.

Figure 2:
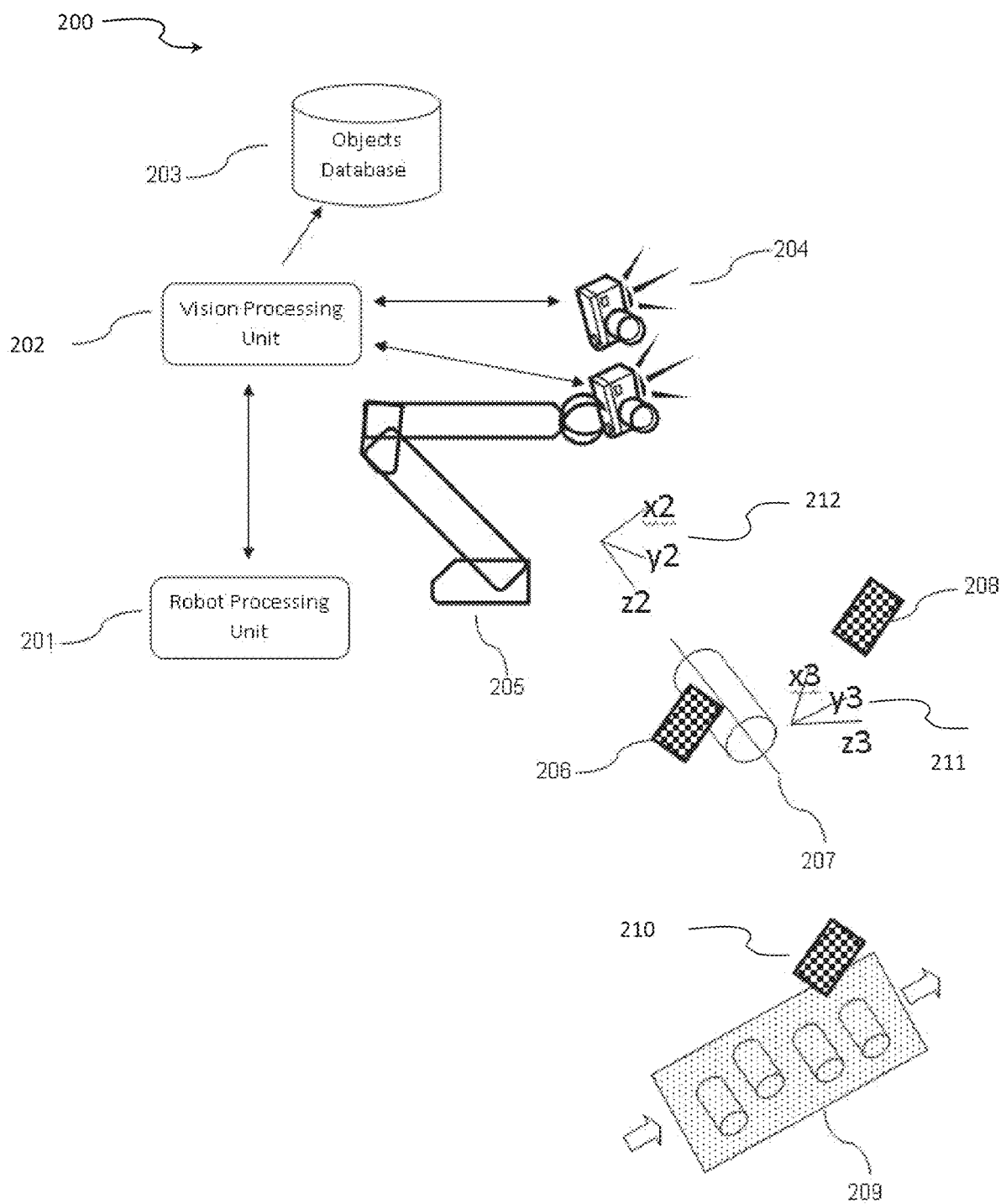
FIG. 2 is a schematic illustration of another exemplary scenario of generating a dataset mapping visual features of an object, according to some embodiments of the present invention.

Reference is also made to FIG. 2, a schematic illustration of another exemplary scenario of generating a dataset mapping visual features of an object, according to some embodiments of the present invention.

Referring now to the drawings, FIG. 2 illustrates another exemplary scenario 200 of generating a dataset mapping visual features of an object, according to some embodiments of the present invention. As shown in the illustrated scenario 200, at least one image sensor 204 is being held by a mechanical device 205. The image sensor may be a camera, a depth map sensor or the like. The mechanical device 205 may be a robot, a robotic machine, or other mechanical device with at least one degree of freedom in motion in space. An object under training 207 may be positioned in fixed place or may be placed on a movable mechanism, for example a conveyer 209. The robot 205 is set to move the camera 204 from one position in space to another position in space, in a way that the object 207 is kept in the field of view of the camera. This way, images of the object may be captured from different angles, distances and aspects. Visual signs may be attached to the conveyer 210, to the object 206 and/or to any object or equipment in the field of view of the sensor 208. The visual signs may assist and improve the ability to process images taken by the sensors and to provide improved accuracy in extracting positional information. The visual signs may be bar codes, unique color labels, custom printed stickers in different sizes, chessboard stickers, and the like. For illustrative purposes, a virtual three dimensional coordinates system is shown as 212. Vision Processing Unit 202 is a computing system for processing and analyzing images captured by the image sensors 204, as is described below. Vision Processing Unit 202 may be comprised of software components and hardware elements including, but not limited to, at least one hardware processor, at least one input/output interface, at least one communication interface, memory medium and user interface. Robot Processing Unit 201 is a computing system that receives and processes positional data of the robotic machine that holds the image sensor 204, and communicates the information with the Vision Processing Unit 202. The Robot Processing Unit 201 may receive instructions from the Vision Processing Unit 202 to control the robotic machine 205 to move the image sensor 204 from one position to another position. Robot Processing Unit 201 may be comprised of software components and hardware components, including at least one processor, communication interface, input/output interfaces and storage medium. Objects Database 203 is a storage medium that stores datasets of objects, as will be explained below. The Object Database 203 may be controlled by the Vision Processing Unit 202. The datasets stored on the Object Database 203 may be in digital format, flat files or other digital data storage format with a schema that is optimized to store and dynamically be retrieved by the Vision Processing Unit 202. The positional information reported by the Robot Processing Unit 201 may include 3 dimensional location of the end point of the robotic machine using x, y, z coordinates in the coordinates system 212, and rotational information Rx, Ry, Rz of the end point relative to the x, y, z coordinates.

Additional mechanical devices may be incorporated into the training system. For example, a conveyer 209 reports its positional data to other mechanical devices processing units such as 201 and/or to the Vision Processing Unit 202 and this information is also stored associated to the rest of the data retrieved for this position and point in time. A conveyer 209 may report positional information using encoders. Encoder may be a digital encoder, analog encoder, optical encoder and the like.

Figure 3:
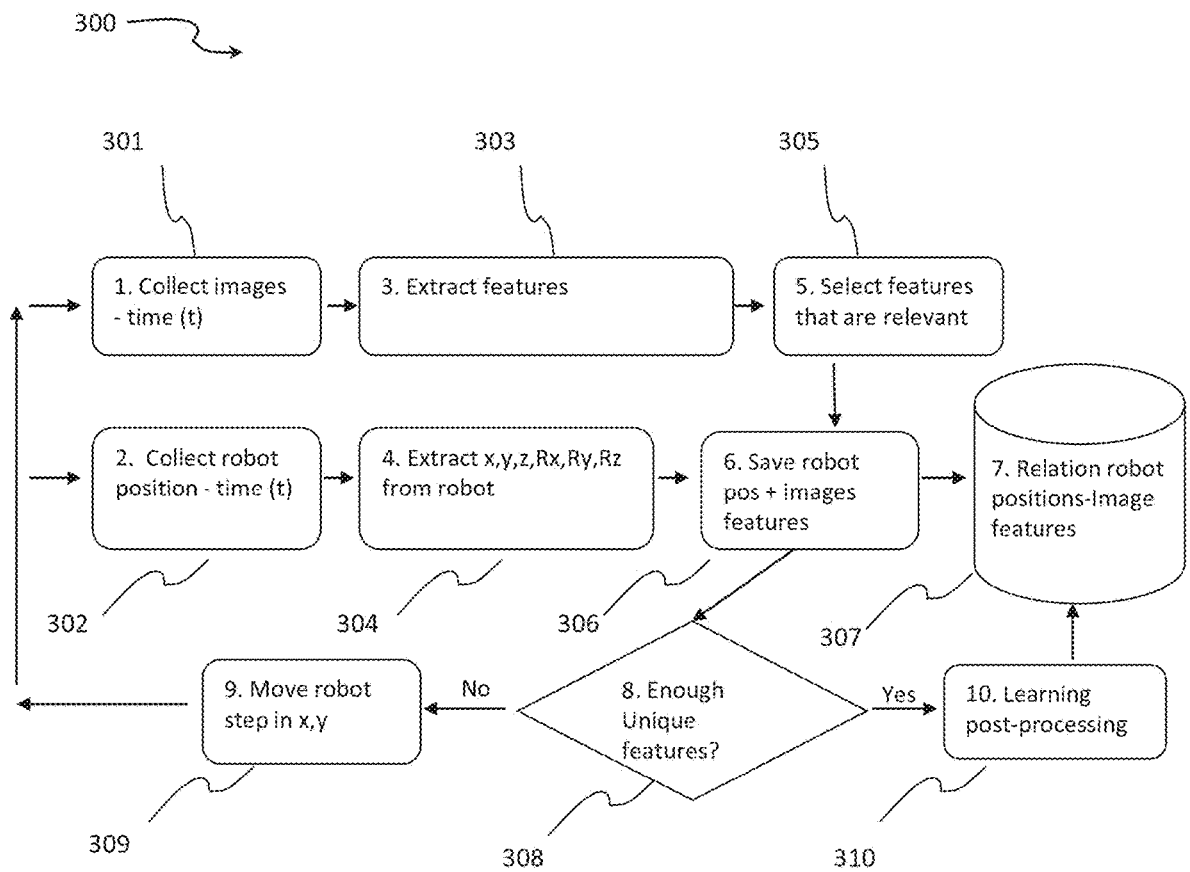
FIG. 3 is a flowchart of an exemplary process of generating a dataset mapping visual features of an object, according to some embodiments of the present invention.

Reference is also made to FIG. 3, a flowchart of an exemplary process of generating a dataset mapping visual features of an object, according to some embodiments of the present invention.

The method for generating a dataset mapping visual features of an object is an iterative process. Process 300 depicts an exemplary single iteration in the method. The multi iteration process is referred herein as a training process that is conducted in order to train an object to the system.

Reference is made again to FIG. 1. Scenario 100 is an exemplary setup of a system to conduct process 300. Object 105 is held by a mechanical device 107. Optionally, the mechanical device is a robot or a robotic machine. Optionally, the robotic machine is equipped with a gripper 105 adapted to hold the object. The gripper may be of different variations, for example—different degrees of freedom, different sizes, different mechanical element, different holding capabilities, adapted to hold objects of different shapes, adapted to hold objects of different weight, adapted to handle objects of different rigidness, and the like. The robot is adapted to move the object from one position in space to another position in space according to instruction received from the Robot Processing Unit 110. Optionally, the robot moves the objects in steps. Optionally the steps size is randomly selected. Optionally, the step size is a predefined step size. Optionally the step direction is randomly defined. Optionally, the step direction is predefined. Optionally, identifiable signs 108 are attached to the end point of the robot. Optionally, identifiable signs are attached to the object 106.

As shown in process 300, in step 301 images of the object 105 are collected. The images are captured by at least one image sensor 102. Optionally, images are captured by additional image sensor 101. Optionally an image sensor is a camera. Optionally, an image sensor is a depth map sensor. The images are collected by Robot assisted Object-Learning Vision system 113. The images may be transferred from the image sensor(s) to the Robot assisted Object-Learning system through wired communication channel. Optionally the images are transferred through wireless communication channel. A time stamp of each of the captured images may be transferred to the Robot assisted Object-Learning system and associated to the respective image. In step 302, the Robot Processing Unit 110 collects positional data of the robotic machine. Optionally, the positional data is received from encoders mounted on the robotic machine. The encoders may be digital encoders, analog encoders, optical encoders and the like. The Robot Processing Unit receives from the robotic machine rotational information of the end point of the robot. The rotational information may be relative to the positional information of the robot. The positional information may consist of Cartesian coordinates relative to a predefined point in space 114. Time information associated with the positional information is collected by the Robot Processing Unit 110. In step 304, the Robot Processing Unit extracts from the positional data a 3D data which may consist of 3 dimensional coordinates x, y, z, and 3 rotational variables Rx, Ry and Rz representing the rotational information in 3 degrees of freedom of the end point around the positional coordinates. Optionally, the end point is a gripper. In step 303, the Vision Processing Unit 111 analyzes the images collected from the image sensors. The analysis includes extraction of a set of visual image features of the object 105, as captured by the image sensors. The set of features may include contours, center of contours, size of contours, edges, color areas, etc. Optionally, a visual feature is a 2D feature. Optionally, a visual feature is a 3D feature. In step 305, the Robot assisted Object-Learning Vision system may select a group of the extracted features. The selection may be performed based on pre-configuration of the system and/or based on previously learned objects and identification of features that are unique to current scene. Optionally, a user defines criteria for the selection. In step 306, the Robot assisted Object-Learning vision associates the positional information and the rotational information collected by the Robot Processing Unit with the image visual features extracted by the Vision Processing Unit. The association may be conducted based on a match between the time stamp received with the images and the time stamp received with the positional and rotational data. In step 307, data records comprising the positional data, the rotational data and the associated image visual features are stored in Object Database 112. Optionally, a quantified value for each of the image visual features is stored in the respective data record. Optionally, additional information is added manually by a user. Optionally, the additional information is a designation of "good" object. Optionally, the additional information is a designation of "bad" object. In step 308, the Robot assisted Object-Learning vision system 113 may determine when there is a need to perform another iteration, or to terminate the process. A decision may be based on a threshold. The threshold may be previously configured as number of iterations. The threshold may be defined as an area in space that must be scanned. For example, it may be decided that the scanning process should cover a cubic space of 1 m×1 m×1 m. When this space is covered, the trigger indicates that no more iterations are needed. Step 309 is performed when another iteration is needed. In such case, the Robot assisted Object-Learning vision system instructs the mechanical device to move the object to a next position in space. Optionally, the movement is defined as a given unit distance in a given direction (for example, one step of 1 mm in x axes). The Robot assisted Object-Learning Vision system may be configured to instruct the robot to go through a cubic area by signaling the size in axes X, Y, Z of the space to be scanned. For example, when x reaches limit of this cube in X axis, it may be reinitialized while y in Y axis is incremented 1 mm. When y limit is reached in Y axis, both x and y may be reinitialized and z is incremented one step in Z axes. After step 309 is conducted, and the robotic machine has moved the object to a next position in space, a next iteration is started from steps 301 and 302. When in step 308 a decision is made that no more iterations are needed, a next step is step 310. Step 310 is a post-processing step, conducted by, for example, the Robot assisted Object-learning Vision system on the data records stored in the Objects Database 112. In this step the visual features stored in the dataset of the trained object in the Objects Database are analyzed. Each feature is analyzed and considered whether the feature assists in uniquely identifying the particular object newly trained into the system. Those features identified as not relevant are marked as such. This analysis is conducted by comparing each feature of the newly trained object with relevant features of previously stored datasets of previously trained objects. The rest of the objects stored in the database. When no feature is found to identify such uniqueness, the process may progressively mark additional features of previously trained objects as relevant. The post-processing process continues in an iterative way until finding unique features in each object. When no combination of features is found to define the newly trained object as unique, the system may report an error. An error may be indicative of ambiguous object. The ambiguous object may be an object already existing in the data base, or an object that it may be hard to distinguish it from previously learned objects.

Figure 4:
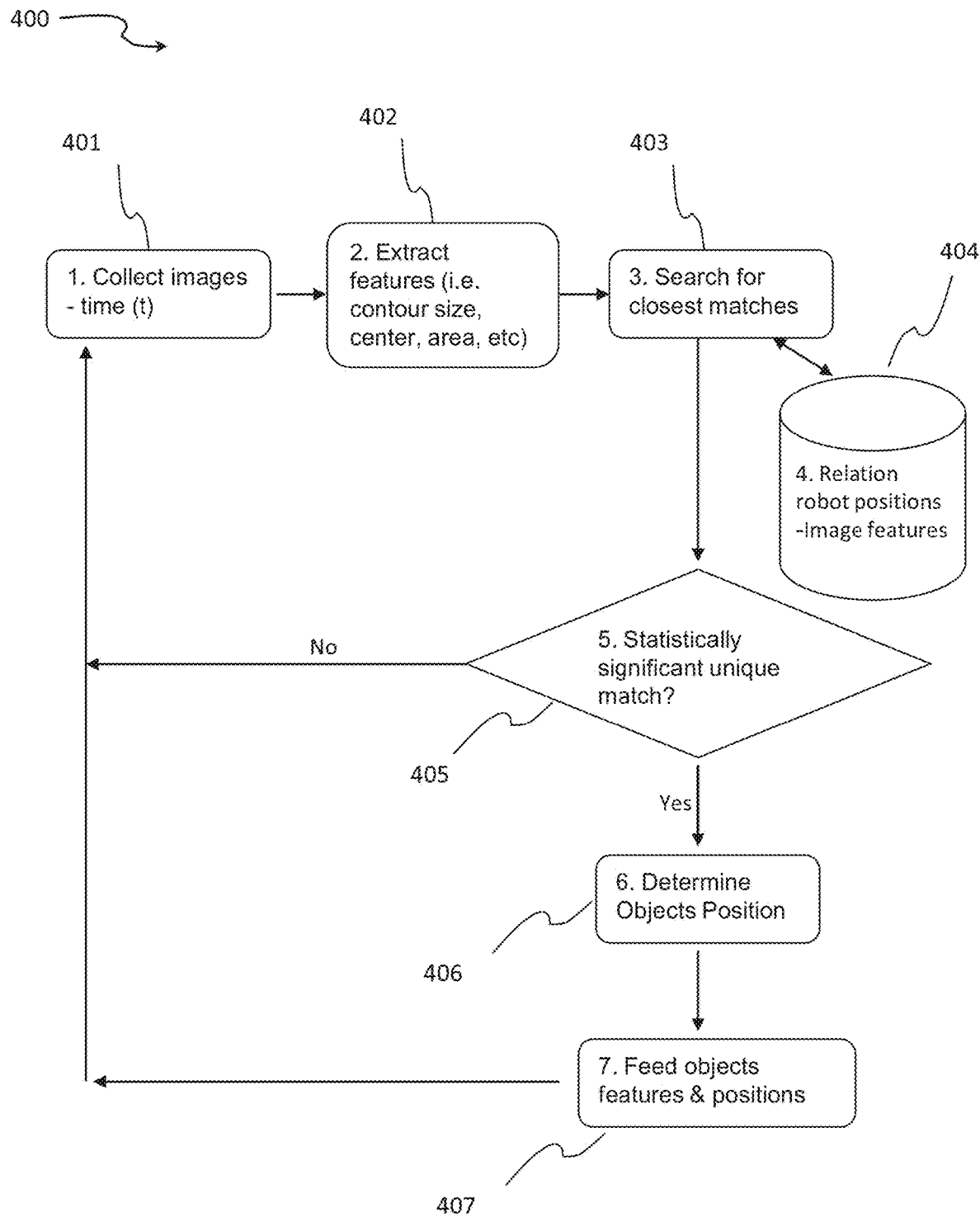
FIG. 4 is a flowchart of an exemplary process of using dataset mapping visual features of an object, according to some embodiments of the present invention.

Reference is also made to FIG. 4, a flowchart of an exemplary process of using dataset mapping visual features of an object, according to some embodiments of the present invention. Reference is also made to FIG. 1.

Flowchart 400 depicts a method for a system to identify new objects by using previously trained objects. As shown in step 401, Robot assisted Object-Learning Vision system 113 collects images captured by an image sensor 102. Optionally the sensor is a camera. Optionally, the sensor is a depth map sensor. The captured images depict an object 105 held by a mechanical device 109. Optionally, the mechanical device is a robotic machine. Optionally, the mechanical device is a conveyer. The object 105 may be a biscuit, a vegetable, a box, a wet wipe, manufactured goods, raw materials, semi-manufactured goods, a packing box, a case, etc. In step 402, the Vision Processing Unit 111 analyzes the images and extracts visual image features of the object. Optionally, the image features are 2D features. Optionally, the visual features are 3D features. The features may be number of contours, contours' sizes, perimeters and areas and the like. Optionally, the extracted features are features that have been previously marked as relevant in step 305 of process 300, in the dataset of trained objects stored in the Objects Database 112. In step 403, the system searches through the Objects Database 112 to identify a record that best matches the features extracted from the currently inspected object. For example, the record corresponding to a previously stored object that has same x, y pixel center and similar diameter, a number of contrast points (for example by using a function like findContrast) within its range, etc. In Step 405 the system determines when the match found is statistically significant. When the decision is that the match is significant, it is assumed that the object being inspected is identified as similar to the object in the Database, with the matching feature. The system then proceeds to step 406. In step 406, the system retrieves from the record of the identified object in the dataset in the Database 112 the 3D positional data, as described in FIG. 1. At step 407, the system feeds the information retrieved about the identified object to other software modules or robot control software that may perform given actions and tasks on the particular object found. When in step 405, the decision is that there is no unique match between extracted features and the features of trained objects, the system may repeat steps 401 through 405 in attempt to identify another feature that may be matched to a feature of an object in the data base.

Figure 5:
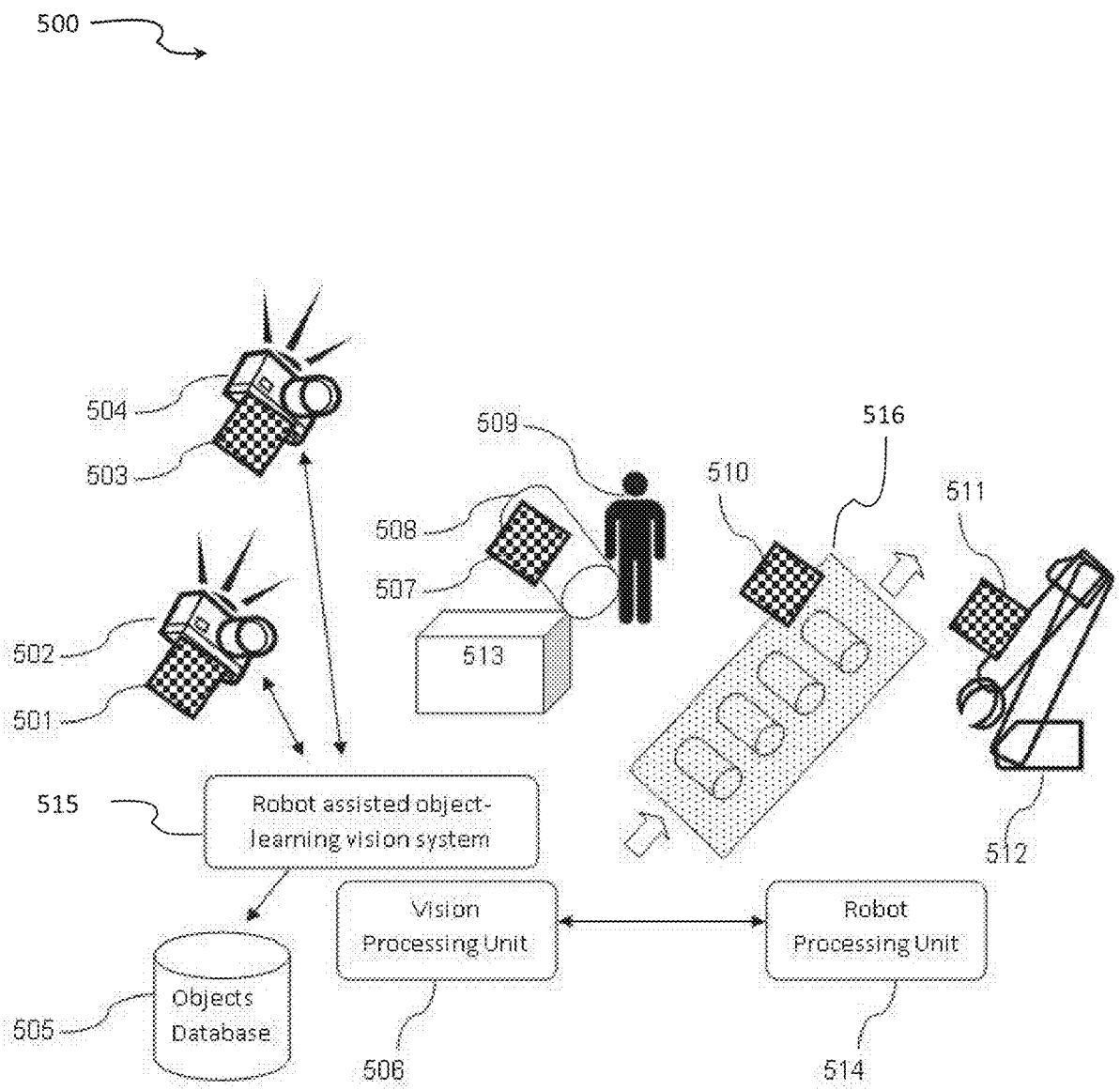
FIG. 5 is a schematic illustration of an exemplary scenario of training a system to an object with human assistance, according to some embodiments of the present invention.

Reference is now made to FIG. 5, a schematic illustration of an exemplary scenario of training a system to an object with human assistance, according to some embodiments of the present invention. In scenario 500, a human 509 assists the system in the training process. As described above, a mechanical device 512 such as, for example a robotic machine or a robot is placed in the working area and needs to be trained to perform tasks related to an object 508. For example, a task is to grasp an object from a conveyer 516 and place it in a box 513. Visual signs may be attached to the robotic machine 511. Optionally visual signs are attached to the conveyer 510. Optionally a visual sign is attached to the object 507. The visual signs may be bar codes, unique color labels, custom printed stickers in different sizes, chessboard stickers, and the like.

For example, the human 509 demonstrates the task of picking an object 508 from the conveyer 516 and placing it in the box 513. During the demonstration, one or more image sensors 502 and 504 may capture images depicting the demonstration. Optionally, at least one of the image sensors is a camera. Optionally, at least one of the image sensors is depth map sensor. As described in FIG. 1 and FIG. 3, images and 3D coordinates of the object are being collected. When the object is a new object to the system, the system uses process 300 described in FIG. 3 to store a dataset for the new object. When the object is an object that was already trained to the system and stored in Objects Database 505, or when there are uniquely identifiable visual signs on it 507, process 400 will be conducted, as described in FIG. 4, to identify the object in the scene. Optionally, 3D positional data is collected, such as aligned depth map and RGB frame generated by the depth sensor and digital camera. The Vision Processing Unit 506 detects the displacement of the object 508 in space and its relative position with regards to the sensors. The Robot assisted Object-Learning Vision system 515 extracts from the positional information of the object the way the human packed the object in the box 513. Optionally, visual signs are placed on the sensors 501 and 503 to facilitate the process of identifying the relative position of the sensors, with regards to each other, and of with regards to the identified object. The robot 512 is identified by the sensors as well. This enables the Vision Processing Unit to translate the relative position of the object with regards to the sensor(s), to relative positions of the objects with regards to the robot. In a later stage, the Vision Processing Unit may transfer to the robot processing unit 514 these positions relative the robot, and coordinates the robots movements so that it may perform the pick and place task of the learned object, and place the object with the same distribution inside the box 513.

Figure 6:
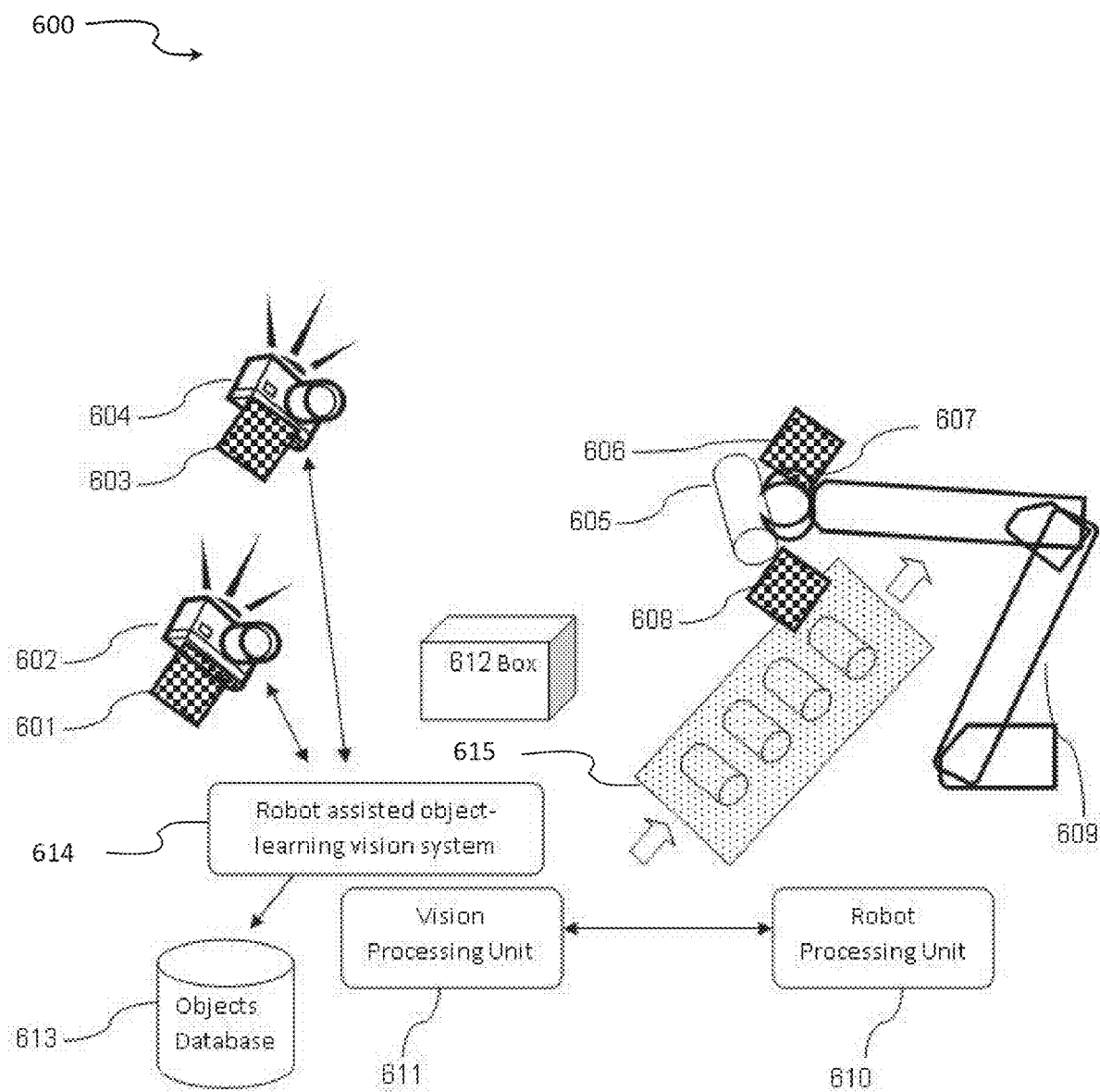
FIG. 6 is a schematic illustration of an exemplary scenario of using dataset mapping visual features of an object, according to some embodiments of the present invention.

Reference is made to FIG. 6, a schematic illustration of an exemplary scenario of using dataset mapping visual features of an object, according to some embodiments of the present invention.

As shown in FIG. 6, in the illustrated scenario 600, a mechanical device 609 is shown holding an object 605. The mechanical device may be a robot, a robotic machine or any other mechanical device having at least one degree of freedom in motion in space dimension. Object 605 may be a biscuit, a vegetable, a box, a wet wipe, manufactured goods, raw materials, semi-manufactured goods, a packing box, a case, etc. The robotic machine 609 may be equipped with a gripper 607 for holding the object. Gripper 607 may have various shapes, sizes and designs to be adapted to grip different objects. A gripper may have different number of degrees of freedom, depending on the design complexity, the operational requirements, the shape and characteristics of the objects and the complexity of the tasks assigned to the robotic machine. The system includes at least one image sensor 602 and 604. The image sensor(s) may be a camera, a depth map sensor and the like. The robotic device is set to move the object 605 and to manipulate it according to the tasks assigned to the robot, in front of the image sensor 602, 604. Visual signs may be attached to the sensors 601 and 603, to the end point or the gripper of the mechanical device 606 and/or to any object or equipment 608 in the field of view of the sensors 602 and 604. Optionally a conveyer 615 is provided as part of the operational environment, to transfer the object and other objects during operation. Optionally visual sign 608 is placed attached to the conveyer 615. The visual signs 601, 603, 606 and 608 facilitate the identification and conversion of coordinates of the object relative to sensors, relative to box and/or relative to the robot. The operational environment may be a manufacturing line, a packing line where objects like object 605 need to be placed in boxes like 612, an object selection line and the like. The visual signs may assist and improve the ability to process images taken by the sensors and to provide improved accuracy in extracting positional information. The visual signs may be bar codes, unique color labels, custom printed stickers in different sizes, chessboard stickers, and the like.

Vision Processing Unit 611 and Object-Learning Vision system 614 are computing systems for processing and analyzing images captured by the image sensors 602 and 604. Vision Processing Unit 611 and Object-Learning Vision system 614 may be comprised of software components and hardware elements including, but not limited to, at least one hardware processor, at least one input/output interface, at least one communication interface, storage medium and user interface. Robot Processing Unit 610 may be a computing system that receives and processes positional data of the robotic machine and communicates the information with the Object-Learning Vision system 614. Robot Processing Unit 610 may be comprised of software components and hardware components, including at least one processor, communication interface, input/output interfaces and memory medium. Objects Database 613 is a storage medium that stores datasets of objects, as explained above. The Object Database 613 is controlled by the Object-Learning Vision system. The datasets stored on the Object Database 613 may be in digital format, flat files or other digital data storage format with a schema that is optimized to store and dynamically be retrieved by the Object-Learning Vision system. As shown in scenario 600 objects may be moving on conveyer 615. In order to retrieve information to identify the object and what task to perform with it, the Robot Processing Unit 610 communicates with the Vision Processing Unit 611 which performs the process 400 described in FIG. 4 using Objects Database 613.

Figure 7:
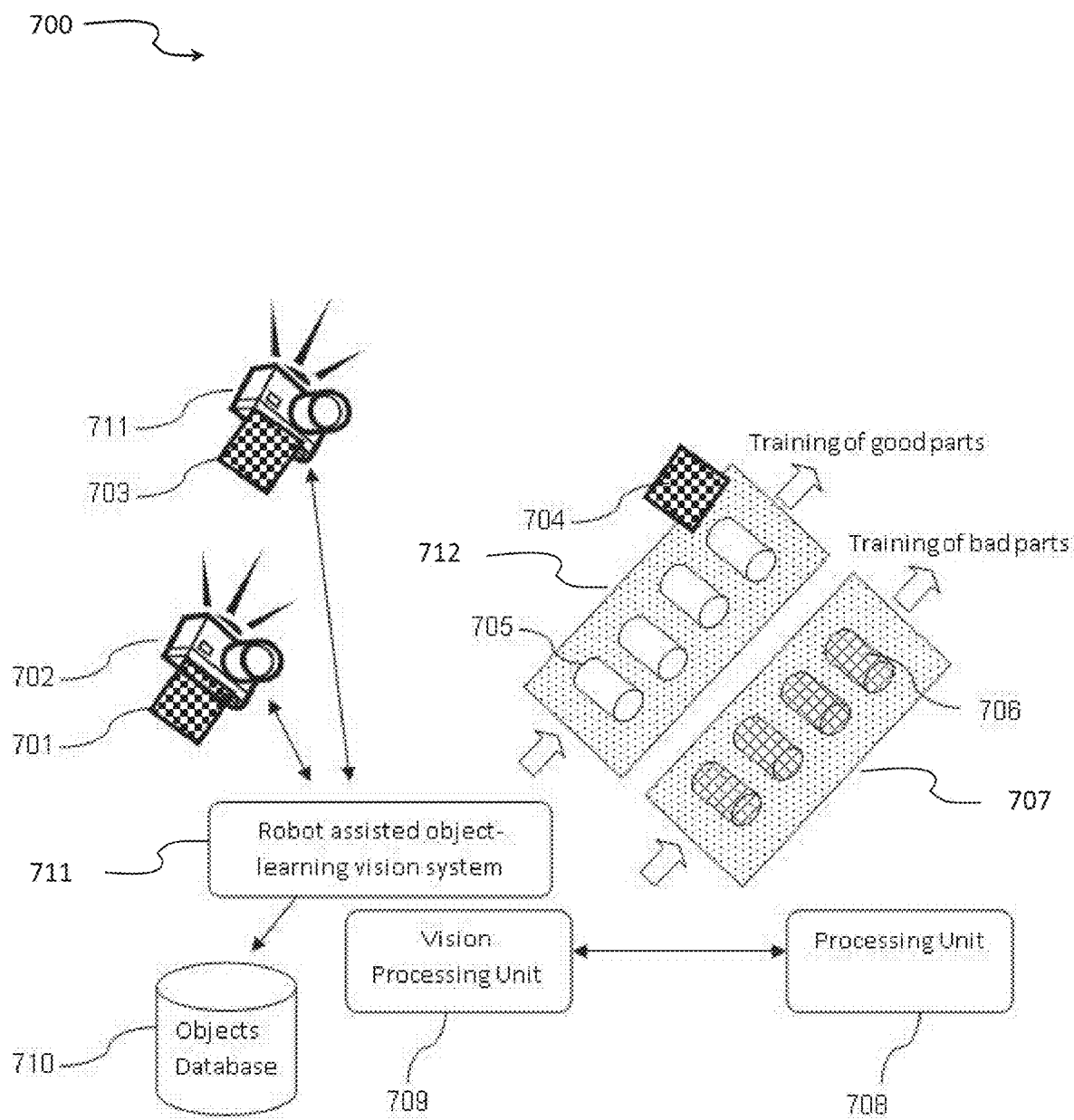
FIG. 7 is a schematic illustration of an exemplary scenario of generating a dataset mapping visual features of an object in a quality control process, according to some embodiments of the present invention.

FIG. 7 is a schematic illustration of an exemplary scenario of generating a dataset mapping visual features of an object in a quality control process, according to some embodiments of the present invention. As shown in scenario 700, a set of objects 705 that are considered as complying the specifications of such objects are presented in front of the system's sensors 702 and 711. Optionally the object 705 is placed in a fixed position. Optionally, object 705 is placed on a conveyer in a conveyer 712. As described in process 300 of FIG. 3 the object is trained to the system using Robot assisted Object-Learning system 711, Vision Processing Unit 709, Objects Database 710 and Processing Unit 708. Optionally visual identification signs 701,703 are placed on each of the sensors in the scene in order to allow each of the sensors to detect the relative position of the other sensor. Optionally visual sign 704 is attached to the conveyer 712. The visual signs may be bar codes, unique color labels, custom printed stickers in different sizes, chessboard stickers, and the like. The Processing Unit 708 operates in the same manner as the Robot Processing Unit 110 of scenario 100. Processing Unit 708 controls the conveyer 712. Optionally, a conveyer encoder position is used and reported by the Processing Unit. Alternatively, no positional data is used and no mechanical device is present. When no mechanical device is used, no positional information is provided to the Vision Processing Unit 709. Optionally, the system detects object 705 without positional information. Optionally, additional features are manually entered to the database 710 associated with the object 705. Optionally, the additional features are entered by an operator. Optionally, additional features are classification of the object. Optionally, the classification assigns a designation of a value of "Good Object". Using similar approach, a set of objects that do not comply with specification of the objects 706 are presented in front of the sensors and trained to the system as described above. Optionally, additional features are manually entered to the database 710 associated with the object 706. Optionally, the additional features are entered by an operator. Optionally, the additional features are a designation of a classification of the object, for example a value of "Bad Object". The above description demonstrates a process of executing the training process once on "good objects", and once on "bad objects" such that the system detects unique 2D and/or 3D features that uniquely identify objects that comply with specs from objects that do not comply with specs. The additional human feedback described above as manual entry of features, allows the system to identify false positives/false negatives and improves the identification and classification mechanism by the Vision processing unit 709. Those features that uniquely identify "good" objects from "bad" objects, are stored in the objects database and are retrieved later to identify and classify objects inspected according to process 400 described in FIG. 4.

Figure 8:
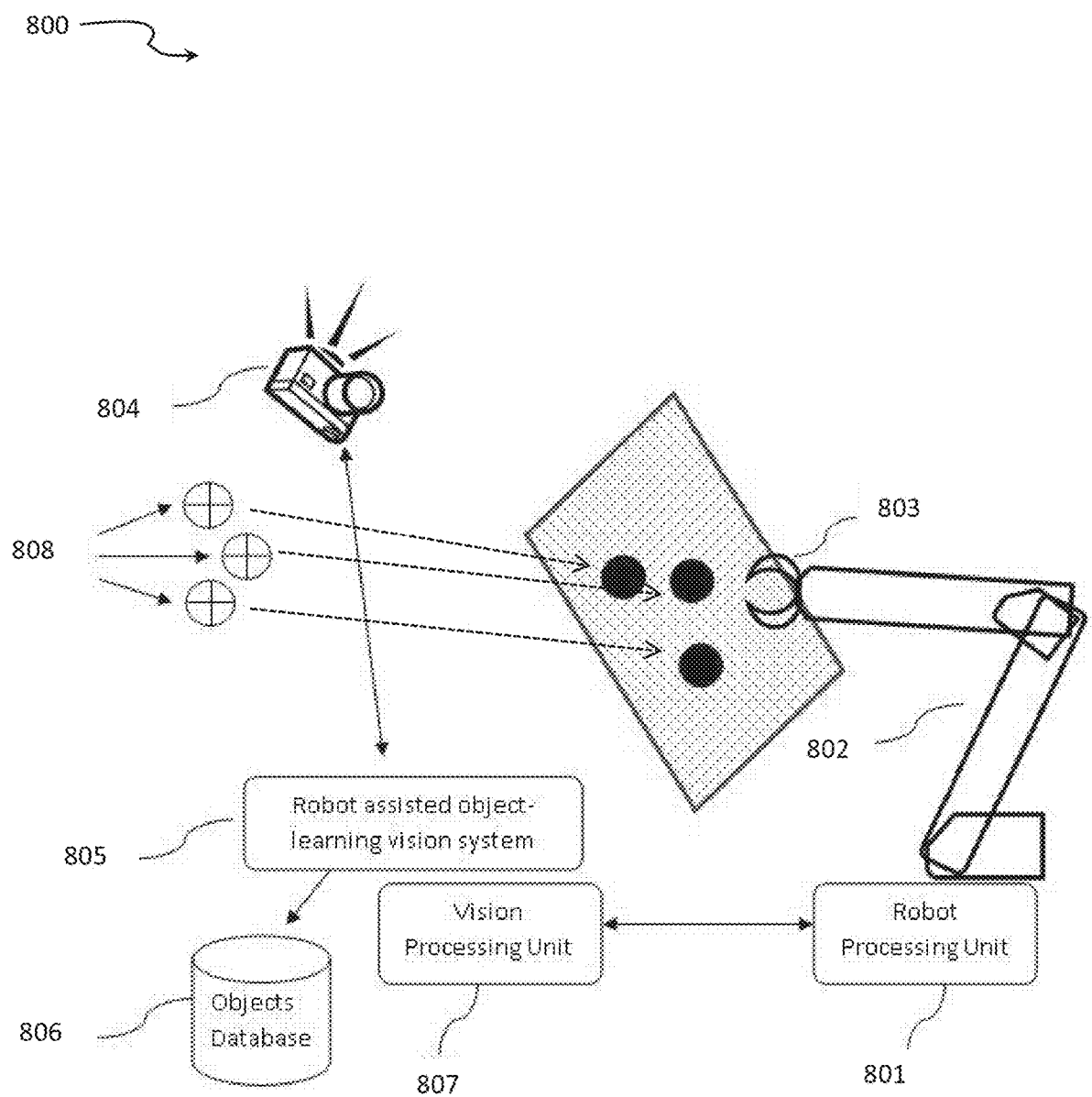
FIG. 8 is a schematic illustration of an exemplary scenario of generating a dataset mapping visual features of an object assisted by co-planar circular stickers, according to some embodiments of the present invention.

FIG. 8 is a schematic illustration of an exemplary scenario of generating a dataset mapping visual features of an object assisted by co-planar circular stickers, according to some embodiments of the present invention. As shown in scenario 800, the training process is similar to scenario 100, and includes a mechanical device 802 like a robot, controlled by a Robot Processing Unit 801, an image sensor, like a digital camera 804, and Robot assisted Object-Learning Vision system 805, Vision Processing Unit 807 and Objects Database 806, similar to process 100 of FIG. 1. The scenario 800 is assisted by adding one or more circular stickers 808 to the surface of an object 803. This object is held to the end point of the robot 802. The stickers may be of a high-contrast color with respect to the background in order to assist image segmentation process. For every given position of the robot, according to the process 300 described in FIG. 3, the digital camera sends the frame image to the Vision Processing Unit 807. The Vision Processing Unit then extracts the pixel coordinates of the center of each sticker, as well as the length in pixels of the minor and major axes of the 2D ellipse corresponding to the each of the circular stickers. When an image of a circular sticker is taken not exactly from a parallel plane to the plane of the sticker, the circular shape of the sticker appears in the 2D image as an ellipse having minor and major axes. As the robot moves during the training process 300, each circular sticker has different values associated to it for x, y center coordinates and major and minor axes, measured in pixels. As described above in process 300, for each frame, the robot reports, by the Robot Processing Unit 801, to the Vision Processing system 807 the x, y, z coordinates of the end-point and the Rx, Ry, Rz rotation of the end point with regards to each axis. These coordinates are associated with the values extracted from the image of the circular stickers for each frame, and stored in the Objects Database 806 for later retrieval.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant software engineering and deep learning methodologies will be developed and the scope of the terms such as dataset, training a system and robot assisted learning is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for generating a dataset mapping visual features of each of a plurality of objects, comprising:
    for each of a plurality of different objects:
        conducting a plurality of iterations, wherein each iteration comprising:
            instructing a robotic system to move an arm holding a respective said object to a next position of a plurality of different positions,
            acquiring at least one image depicting said respective object in a perspective of said next position,
            receiving positional information of said arm in respective said next position,
            analyzing said at least one image to extract at least one visual feature of said object as depicted in said at least one image in said respective next position,
            capturing a value of a parameter shared by said at least one visual feature with said positional information to create an association between said at least one visual feature and said positional information, and
            storing, in a mapping dataset, at least one record comprising said at least one visual feature, said positional information and said shared parameter value; and
    upon termination of said plurality of iterations, outputting said mapping dataset;
    wherein said at least one visual feature is a plurality of features including at least the features of:
        a sum of a blue channel value of all pixels within a contour of said object, divided by a sum of a green channel value and a red channel value of all pixels in said contour of said object,
        a sum of said green channel value of all pixels within said contour of said object, divided by a sum of said blue channel value and said red channel value of all pixels in said contour of said object,
        a sum of said red channel value of all pixels within said contour of said object, divided by a sum of said blue channel value and said green channel value of all pixels in said contour of said object,
        a perimeter of said object and
        a number of corners of said object.

2. The method of claim 1, wherein said at least one image is captured by at least one camera.

3. The method of claim 1, wherein said at least one image is a depth map captured by at least one sensor.

4. The method of claim 1, wherein said at least one visual feature is a member of a group consisting of a two dimensional image feature (2D) and a three dimensional (3D) image feature.

5. The method of claim 1, wherein said instructing includes at least one motion command that includes a step size and a step direction.

6. The method of claim 5, wherein said step size and said step direction are pre-defined.

7. The method of claim 5, wherein said step size and said step direction are randomly selected.

8. The method of claim 1, wherein said at least one visual feature is a member of a group consisting of contour, center of contour, number of contours, edges, color areas, size, perimeter and area.

9. The method of claim 1, wherein said blue channel value is a modified blue channel value calculated according to a weighted calculation of said blue channel value, said green channel value and said red channel value,
wherein said green channel value is a modified green channel value calculated according to a weighted calculation of said blue channel value, said green channel value and said red channel value, and
wherein said red channel value is a modified red channel value calculated according to a weighted calculation of said blue channel value, said green channel value and said red channel value.

10. The method of claim 9, wherein said plurality of features further including the features of:
An indication when a sum of a modified blue channel value of all pixels within said contour of said object, divided by a sum of modified green channel value and modified red channel value of all pixels in said contour of said object is greater, or smaller than a first predefined threshold divided by a total number of pixels in said contour of the object,
An indication when a sum of a modified red channel value of all pixels within said contour of said object, divided by a sum of modified green channel value and modified blue channel value of all pixels in said contour of said object is greater, or smaller than a second predefined threshold divided by said total number of pixels in said contour of said object, and
An indication when a sum of a modified green channel value of all pixels within said contour of said object, divided by a sum of modified red channel value and modified blue channel value of all pixels in said contour of said object is greater, or smaller than a third predefined threshold divided by said total number of pixels in said contour of said object.

11. The method of claim 1, wherein when said object has a spherical or elliptical shape, said plurality of features further including a factor calculated by a division of a dimension of major axis of said spherical or elliptical shape by a dimension of a minor axis of said spherical or elliptical shape.

12. The method of claim 1, wherein said storing includes storing in said mapping dataset a quantified value of said at least one visual feature.

13. The method of claim 1, wherein said analyzing includes identifying in said at least one image at least one identifiable sign attached to at least one of said object and a gripping part of said robotic system.

14. The method of claim 1, wherein said robotic system is a conveyer having a conveyer belt for moving said object.

15. The method of claim 1, wherein said positional information is extracted by an encoder.

16. The method of claim 1, wherein said storing includes storing of at least one characteristic of said object, provided by a user.

17. The method of claim 16, wherein said at least one characteristic is an indication of said object being characterized as a good object or a bad object.

18. The method of claim 1, wherein said shared parameter is selected from a group consisting of time stamp and frame sequence.

19. A method for generating a dataset mapping visual features of each of a plurality of objects, comprising:
for each of a plurality of different objects:
conducting a plurality of iterations, wherein each iteration comprising:
instructing a mechanical device equipped with at least one sensor to move to a next position of a plurality of different positions,
acquiring at least one image, captured by said at least one sensor, and depicting said respective object from a perspective of said next position;
receiving positional information of said mechanical device in respective said next position;
analyzing said at least one image to extract at least one visual feature of said object from said perspective of said respective next position,
capturing a value of a parameter shared by said at least one visual feature with said positional information to create an association between said at least one visual feature and said positional information, and
storing, in a mapping dataset, at least one record comprising said at least one visual feature, said positional information and said shared parameter value; and
upon termination of said plurality of iterations, outputting said mapping dataset;
wherein said at least one visual feature is a plurality of features including at least the features of:
a sum of a blue channel value of all pixels within a contour of said object, divided by a sum of a green channel value and a red channel value of all pixels in said contour of said object,
a sum of said green channel value of all pixels within said contour of said object, divided by a sum of said blue channel value and said red channel value of all pixels in said contour of said object,
a sum of said red channel value of all pixels within said contour of said object, divided by a sum of said blue channel value and said green channel value of all pixels in said contour of said object,
a perimeter of said object and
a number of corners of said object.

20. The method of claim 19, wherein said instructing includes at least one motion command that includes a step size and a step direction.

21. The method of claim 20, wherein said step size and said step direction are pre-defined for a training session of generation of said mapping dataset.

22. The method of claim 20, wherein said step size and said step direction are randomly selected.

23. The method of claim 19, wherein said at least one sensor is a camera.

24. The method of claim 19, wherein said at least one image is a depth map.

25. The method of claim 19, wherein said at least one visual feature is a member of a group consisting of a two dimensional image feature (2D) and a three dimensional (3D) image feature.

26. The method of claim 19, wherein said mechanical device is a robotic machine.

27. The method of claim 19, wherein said at least one visual feature is a member of a group consisting of contour, center of contour, number of contours, edges, color areas, size, perimeter and area.

28. The method of claim 19, wherein said storing includes storing in said mapping dataset a quantified value of said at least one visual feature.

29. The method of claim 19, wherein said analyzing includes identifying in said at least one image at least one identifiable sign attached to said object.

30. A method for using a dataset mapping visual features of each of a plurality of objects, comprising:
  using at least one processor to execute code instructions for:
    obtaining at least one image depicting an object;
    analyzing said at least one image to extract at least one image visual feature of said object;
    searching, in a plurality of previously stored mapping data sets, to identify at least one data record included in one of said plurality of previously stored mapping datasets and recording said at least one image visual feature, wherein each of said plurality of previously stored mapping datasets is associated with another one of a plurality of objects and comprising at least one record, wherein each of said at least one record includes at least one image visual feature extracted from an image of said respective another one of said plurality of objects, captured from a different perspective;
    extracting from said at least one identified data record, an object identification attribute and object positional information associated with said at least one visual feature;
outputting said object positional information and said object identification attribute;
  wherein said at least one image visual feature is a plurality of features including at least the features of:
    a sum of a blue channel value of all pixels within a contour of said object, divided by a sum of a green channel value and a red channel value of all pixels in said contour of said object,
    a sum of said green channel value of all pixels within said contour of said object, divided by a sum of said blue channel value and said red channel value of all pixels in said contour of said object,
    a sum of said red channel value of all pixels within said contour of said object, divided by a sum of said blue channel value and said green channel value of all pixels in said contour of said object,
    a perimeter of said object and
    a number of corners of said object.

31. The method of claim 30, wherein said execution of code instructions is repeated when said object is positioned in another one of a plurality of pre-determined positions.

32. The method of claim 30, wherein said at least one image is captured by a camera.

33. The method of claim 32, wherein said object positional information includes positional information of at least one identifiable sign.

34. The method of claim 33, further comprising using said at least one processor to execute code instructions for adjusting said object positional information according to said positional information of said at least one identifiable sign.

* * * * *